(12) United States Patent
Oliver

(10) Patent No.: US 7,349,541 B2
(45) Date of Patent: Mar. 25, 2008

(54) METHOD AND APPARATUS FOR CONTROLLING CONTENT CONSUMPTION

(75) Inventor: Huw Edward Oliver, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 646 days.

(21) Appl. No.: 10/384,461

(22) Filed: Mar. 6, 2003

(65) Prior Publication Data

US 2004/0076298 A1 Apr. 22, 2004

(30) Foreign Application Priority Data

Mar. 7, 2002 (GB) ................................ 0205386.6

(51) Int. Cl.
*G06F 17/60* (2006.01)
*H04N 7/167* (2006.01)
*H04K 1/00* (2006.01)
*H04L 9/00* (2006.01)

(52) U.S. Cl. ........................... 380/231; 705/52; 705/77

(58) Field of Classification Search ................ 380/231, 380/232
See application file for complete search history.

(56) References Cited

U.S. PATENT DOCUMENTS

| | | | |
|---|---|---|---|
| 5,144,662 A * | 9/1992 | Welmer | 380/231 |
| 5,159,633 A * | 10/1992 | Nakamura | 380/30 |
| 5,291,554 A * | 3/1994 | Morales | 380/211 |
| 5,455,953 A | 10/1995 | Russell | |
| 5,822,315 A * | 10/1998 | de Seze et al. | 370/337 |
| 6,334,188 B1 | 12/2001 | Maria | |
| 6,389,538 B1 * | 5/2002 | Gruse et al. | 713/194 |
| 6,744,891 B1 * | 6/2004 | Allen | 380/231 |
| 2001/0042048 A1 | 11/2001 | Boykin et al. | |
| 2002/0114465 A1 * | 8/2002 | Shen-Orr et al. | 380/231 |
| 2004/0172365 A1 * | 9/2004 | Murakami et al. | 705/52 |

FOREIGN PATENT DOCUMENTS

| | | |
|---|---|---|
| EP | 0649121 A2 | 4/1995 |
| EP | 1041823 A2 | 10/2000 |
| JP | 2000244483 | 9/2000 |
| JP | 2002024178 | 1/2002 |
| WO | WO00/75760 A1 | 12/2000 |
| WO | WO02/29660 A1 | 4/2002 |
| WO | WO02/45316 A2 | 6/2002 |

OTHER PUBLICATIONS

W3C, "XML Schema Part 0: Primer—W3C Recommendation", May 2, 2001, http://www.w3.org/TR/2001/REC-xmlschema-0-20010502, 70 Pages.
W3C, "XML Schema Part 1: Structures—W3C Recommendation", May 2, 2001, http://www.w3.org/TR/2001/REC-xmlschema-1-20010502, 193 Pages.
W3C, "XML Schema Part 2: Datatypes—W3C Recommendation", May 2, 2001, http://www.w3.org/TR/2001/REC-xmlschema-2-20010502, 137 Pages.
W3C, XSL Transformations (XSLT)—Version 1.0—W3C Recommendation Nov 16, 1999, http://www.w3.org/TR/1999/REC-xslt-19991116, 97 Pages.

* cited by examiner

*Primary Examiner*—Gilberto Barron
*Assistant Examiner*—Virgil Herring

(57) ABSTRACT

A method and apparatus is provided in which playable content is transmitted in response to a playable-content request; a key for the playable content is separately transmitted in response to a key request. Quality information about the playable content is used to generate tariff information from which a user charge is derived.

13 Claims, 1 Drawing Sheet

METHOD AND APPARATUS FOR CONTROLLING CONTENT CONSUMPTION

FIELD OF THE INVENTION

This document relates to a method of providing playable content, a content provider system, a method of controlling content consumption, a content supervisor, a method of playing playable content, and a content player, particularly but not exclusively for supervising consumption of playable content transmitted over the Internet.

BACKGROUND OF THE INVENTION

A great deal of multimedia information is available over the Internet. This information may comprise for example audio information in the form of music files or Internet radio stations etc., video information, or text or graphical information. Such multimedia information is hereinafter referred to as "playable content". To enable a user to consume playable content, the user's computer must be provided with a content player, that is a program capable of reading the downloaded playable content and displaying or otherwise outputting the playable content in a form accessible by the user. A content player may only be able to play a particular format of playable content, for example audio files using a specific compression system, or may be operable to play content of any one of a number of different formats. The playable content may be completely downloaded prior to playing, or may be continuously supplied by a content provider, a process known as "streaming".

It is desirable for a content provider to be able to track consumption of playable content by a user, for example for subsequent charging.

An aim of the invention is to provide a new or improved of controlling content consumption.

SUMMARY OF THE INVENTION

According to a first aspect of the invention, we provide a method of providing playable content comprising the steps of receiving a playable content request and transmitting said playable content, receiving a key request and separately transmitting a key corresponding to the playable content, receiving quality information relating to the playable content, generating tariff information in accordance with the quality information and generating a user charge in accordance with the tariff information.

The key request may comprise intended usage information and the method may comprise the step of generating a key in accordance with the intended usage information.

The method may comprise the step of recording the intended usage information to a usage store.

The method may comprise the step of transmitting the tariff information.

The playable content may comprise a plurality of content blocks, comprising the step of transmitting a plurality of keys, one key corresponding to each content block.

According to a second aspect of the invention, we provide a content provider system, the content provider system being operable to receive a playable content request and transmit said playable content, receive a key request and separately transmit a key corresponding to the playable content, receive quality information relating to the playable content, generate tariff information in accordance with the quality information and generate a user charge in accordance with the tariff information.

The content provider may comprise a content store and a key generator, the content provider system being operable to transmit requested playable content from the content store and to separately transmit a requested key generated by the key generator.

The content provider system may be operable to transmit the tariff information.

The key request may comprise intended usage information, the content provider system being operable to generate a key in accordance with the intended usage information.

The content provider may further comprise a usage store, wherein the content provider system is operable to store the usage information in the usage store.

According to a third aspect of the invention, we provide a method of controlling content consumption comprising the steps of receiving a key request, the key request comprising intended usage information identifying playable content, generating a key corresponding to the playable content, and transmitting tariff information relating to the playable content.

According to a fourth aspect of the invention, we provide a content provider system, the content provider system being operable to receive a key request from a content supervisor, the key request comprising intended usage information identifying playable content, the content provider system being operable to generate a key and transmit the key to the content provider, and transmit tariff information to the content supervisor.

According to a fifth aspect of the invention, we provide a method of controlling content consumption, comprising the steps of transmitting a key request comprising usage information identifying playable content to a content provider system, receiving a key from the content provider system, transmitting an authorisation to a content player to permit the content player to play playable content received from the content provider system, receiving content quality information from the content player, and transmitting the content quality information to the content provider system.

The method may comprise the step of receiving tariff information from the content provider system in accordance with the transmitted content quality information.

The method may comprise the further step of displaying the tariff information.

The method may comprise the step of receiving an authorisation request from the content player and generating the key request accordingly.

The method may comprise the steps of receiving an authorisation request comprising intended usage information from the content player and generating the key request in accordance with the intended usage information.

The playable content may comprise a plurality of content blocks, the method comprising the step of requesting a key corresponding to each content block.

The authorisation may comprise the key received from the content provider system.

The method may comprise the step of transmitting identification information to the content provider system.

The method may comprise the step of receiving usage information from the content player wherein the usage information comprises details of the playable content blocks.

The method may comprise the step of transmitting the usage information received from the content player to the content provider system.

According to a sixth aspect of the invention, we provide a content supervisor for controlling content consumption, the content supervisor being operable to transmit a key request comprising usage information identifying playable content, receive a key from the content provider system, transmit an authorisation to a content player to permit the content player to play playable content received from the content provider system, receive content quality information from the content player, and transmit the content quality information to the content provider system.

According to a seventh aspect of the invention, we provide a content supervisor for controlling content consumption, the content supervisor being operable to transmit a key request comprising usage information identifying playable content to a content provider system, receive a key from the content provider system, transmit an authorisation to a content player to permit the content player to play playable content received from the content provider system, receive tariff information from the content provider system and display the tariff information.

According to an eighth aspect of the invention, we provide a method of playing playable content received from a content provider system, comprising the steps of receiving a user request to play playable content and generating an authorisation request comprising intended usage information identifying the playable content, transmitting the authorisation request to a content supervisor, receiving authorisation from a content supervisor and playing the playable content where the received authorisation corresponds to the playable content, and transmitting content quality information to the content supervisor.

The method may comprise the steps of checking the validity of the authorisation received from the content supervisor and playing the playable content only if said authorisation is valid.

According to a ninth aspect of the invention, we provide a content player, the content player being operable to receive a user request to play playable content and generate an authorsation request comprising intended usage information identifying the playable content, transmit the authorisation request to a content supervisor, receive authorisatian from the content supervisor and playing the playable where the received authorisation corresponds to the playable content, and transmit content quality information to the content supervisor.

BRIEF DESCRIPTION OF THE FIGURES

An embodiment of the invention will now be described by way of example only with reference to the accompanying drawings, wherein.

DESCRIPTION OF THE PREFERRED EMBODIMENTS

Figure 1:
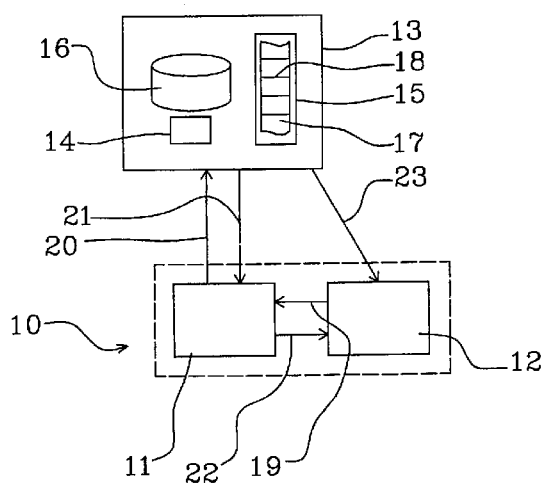
FIG. 1 is a diagrammatic illustration of a content consumption system according to the present invention.

Referring now to FIG. 1, a user's computer is generally illustrated at 10, provided with a content supervisor 11 according to the second aspect of the present invention and a content player 12 according to the fourth aspect of the present invention. In the present example, the content supervisor 11 and content player 12 comprises an appropriate program or software element which may be run by the computer 10. A content provider system according to the sixth aspect of the present invention is shown at 13. The content provider system 13 is provided with a key generator 14, a content store 15, and a usage store 16. The content store 15 and usage store 16 may comprise any appropriate conventional storage medium as desired or as appropriate. The content store 15 comprises a playable content element 17, in this case comprising a plurality of content blocks 18. The content player 12 is able to play the playable content 17. The playable content may for example comprise audio or video information, and the content player 12 may be operable to read the playable content and generate an appropriate output, for example an audible output through speakers or a visual output on a VDU.

When the content player 12 wishes to play a content block 18 stored in the content provider system 13, the content player 12 will generate an authorisation request including intended usage information to the content supervisor 11, shown by arrow 19. As shown by arrow 20, the content supervisor 11 will then generate a key request and transmit it to the content provider system 13. The key request may include intended usage information identifying the playable content the user wishes to play. The content supervisor 11 may also, in this example, have to provide identification information, such that a record of the playable content consumed by the user can be stored in the usage store 16 for subsequent billing.

The key generator 14 provides an appropriate key corresponding to the block 18 which is to be played. The key 14 is then transmitted as shown by arrow 21 to the content supervisor 11. The content supervisor 11 then transmits an appropriate authorisation as shown by arrow 22 to the content player 12 to allow the relevant block 18 to be played. The block 18 is provided from the content provider system 13 to the player 12 as shown by arrow 23 by any appropriate means as desired, and may be transferred before or after the key request from the content supervisor 11. The authorisation transmitted from the content supervisor 11 to the player 12 may simply be the key provided by the key generator 14.

In this description, the word 'key' is intended to refer to any appropriate code or message which may be transmitted by the content provider system 13 to allow content to be played. In one example, the playable content may be encrypted and the key may enable decryption of the encrypted playable content, but the meaning of the 'word' key is not intended to be limited to this meaning.

The content player 12 may check the validity of the key by any appropriate means as desired. For example, the content block 18 may comprise playable content and authorisation validation information. In this case, the player 12 will check the authorisation received from the content supervisor 11 against the authorisation validation information contained in the content block and only play the playable content of the content block 18 if the authorisation is valid and/or consistent with the authorisation validation information. Alternatively, the authorisation validation information may be embedded in the content block 18 and the content player may pass the authorisation to the content block 18 for validation before playing the playable content. Further alternatively, the authorisation validation may take place in the content supervisor 11, for example by the content player 12 transmitting the authorisation validation information to the content supervisor 11 and the content supervisor 11 transmitting a simple play or don't play response to the player 12.

Each content block 18 may be of any appropriate size as desired. Where the content 17 comprises audio files, each block 18 may comprise a single song and the key provided by the key generator 14 will permit the whole song to be played. Alternatively, where the playable content comprises streamed information of a longer duration, for example a continuous Internet radio station, or a web-cast of a sports event, each content block 18 may comprise a block of a particular duration, for example, 5 minutes, and a separate key must be requested to play each successive content block 18. In such circumstances, the content supervisor 11 and/or the content player 12 may be operable to check that not only that each key corresponds to an appropriate content block, but also to check that successive keys are in the right sequence. The playable content may for example comprise a game which must be provided with the right keys at the appropriate time and in sequence to enable the user to keep playing.

It will be apparent that if the content block 18 and corresponding key is transmitted separately, then anyone wishing to intercept and play the relevant content block 18 will also have to intercept and copy the appropriate key for that block and for a plurality of content blocks 18 provide the keys in the correct sequence. The keys and/or playable content may be suitably encrypted to hinder interception and unauthorised playing of the playable content. It will also be envisaged that since each block would be relatively small, the charge for each individual key would be relatively small and so the financial incentive to attempt to intercept the contents and copy the key will also be small.

For a extended group of blocks of playable content, it might be envisaged that the content player 12 identify all the blocks in the authorisation request. The content supervisor 11 might then receive a batch of keys from the content provider system 13 and duly either transmit an authorisation for all the blocks to the content player 12, or successively transmit a separate authorisation for each block as required. This embodiment is advantageous in that a content supervisor 11 need only transmit one key request to the content provider system 13, but is disadvantageous in that the above advantages of generating a separate key for each request corresponding to a single block are lost.

Such a content consumption system allows the content provider to charge a user for the actual content consumed, rather than having to rely on alternative charging mechanisms such as subscription or other flat-rate charges, or the provision of advertising in conjunction with the content. Thus where the user accesses streamed information, the user would not have to pay for the whole stream, but only those parts actually used. It would be envisaged that a user could consume the content for a while, cease and resume use or skip blocks as required. In the example where the content provider system comprises a 24 hour Internet radio station, a user will only be charged for those blocks of the radio station stream actually played.

It will be apparent that such a system permits dynamic charging. For example, the content supervisor 11 may be operable to receive tariff information from the content provider system 13 and display the tariff information to the user. The content provider may then be able to charge different rates for different blocks; in the example of a 24 hour Internet radio station, a higher charge could be made for live concert streaming. The user would be able to view the price and decide whether or not to consume the relevant content. The price may also vary according to other criteria, for example the level of network use so that a higher charge is made when the Internet is busy.

The consumption system may also permit feedback from the content player 12 to the content provider system 13. For example, the content player 12 may analyse the quality of the content blocks 18 received and pass this content quality information to the content supervisor 11 which would then pass the content quality information to the content provider system 13. Where the quality of a content block 18 is low, the content provider system 13 may charge a lower price as appropriate. Any appropriate measure of "quality" may be provided as desired, for example the level of noise in an audio stream or the resolution of a video stream, or the number of breaks or drop outs in the playable content stream.

The content provider system 13 stores the usage information on the usage information store 16. This information may be used for any appropriate purpose, in this case to generate a user charge for the content consumed. The charging may take the form of an aggregated bill or charging the use to a credit card or pre-paid account, or any other charging means as appropriate.

Figure 2:
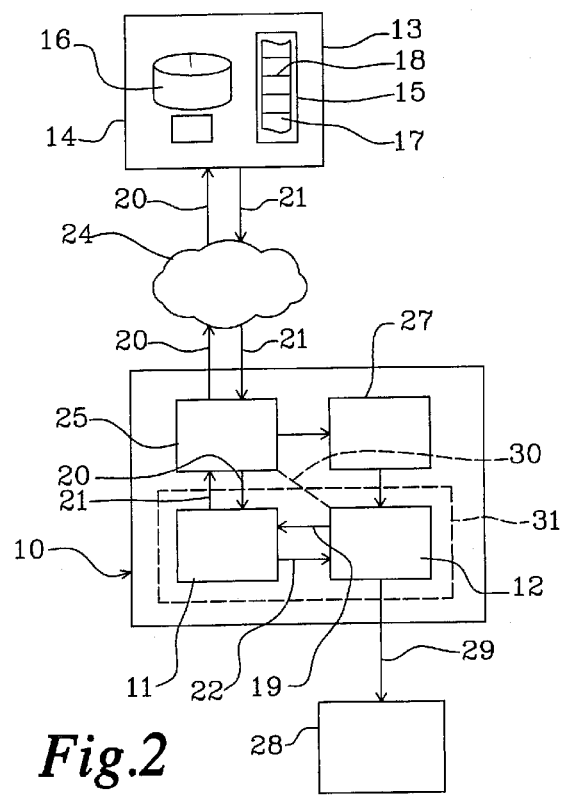
FIG. 2 is a diagrammatic illustration of an example configuration of the system of FIG. 1.

A particular implementation of the present invention is shown in FIG. 2, where features corresponding to those of FIG. 1 are indicated by the same reference numerals. In this example configuration, the user's computer 10 is connected with the content provider system 13 via the Internet 24. The computer 10 is provided with an Internet browser 25 to access the Internet 24. The computer 10 is further provided with a buffer 27 to provide temporary local storage for playable content, and an output means 28 of any appropriate type to receive the output from the content player 12. Hence, the output means may include a visual display unit and/or loudspeakers and/or any other type of user feedback system as appropriate to access the downloaded content.

In this example, the user uses the Internet browser 25 to request desired playable content from the content provider system 13 via the Internet 24. The content block 18 is received by the browser 25 and either passed to the buffer 27 or passed directly to the content player 12 as indicated by the dashed arrow 30. As discussed above, the content player 12 communicates the intended usage to the content supervisor 11 as shown by arrow 19, and the content supervisor 11 requests a key from the content provider system 13 via the browser 25 and Internet 24. The content supervisor 11 then transmits authorisation as shown by arrow 22 to the content player 12 as discussed herein before and the content player 12 then plays the playable content of the downloaded content block 18 and transmits it via a connection 29 to the output means 28.

It might be envisaged that the content player 12 and content supervisor 11 could be provided as a single program element as shown by the dashed outline 31. Alternatively, the computer 10 may be provided with a single content supervisor 11 and a plurality of content players 12, each of which is operable to play playable content of one or more different types or formats. Equally, it would be apparent that the content supervisor 11 may be operable to address two or more content provider systems 13, and provide appropriate identification information or other information corresponding to that particular content provider system 13.

The present invention may be implemented in hardware or software or any combination as desired.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of providing playable content comprising the steps of:
   receiving a playable content request and transmitting said playable content;
   receiving a key request and separately transmitting a key corresponding to the playable content;
   receiving quality information relating to the playable content from a content player, wherein the content player analyses quality of playable content consumed from a content provider system and provides the quality information as feedback to the content provider system;
   generating tariff information in accordance with the quality information received from the content player; and
   generating a user charge in accordance with the tariff information for a user of the content player.

2. A method according to claim 1 wherein the key request comprises intended usage information, the method comprising the step of generating a key in accordance with the intended usage information.

3. A method according to claim 2 comprising the step of recording the intended usage information to a usage store.

4. A method according to claim 1 comprising the step of transmitting the tariff information.

5. A method according to claim 1 wherein the playable content comprises a plurality of content blocks, comprising the step of transmitting a plurality of keys, one key corresponding to each content block.

6. A content provider system, the content provider system being operable to:
   receive a playable content request and transmit said playable content;
   receive a key request and separately transmit a key corresponding to the playable content;
   receive quality information relating to the playable content from a content player, wherein the content player analyses quality of playable content consumed from the content provider system and provides the quality information as feedback to the content provider system;
   generate tariff information in accordance with the quality information received from the content player; and
   generate a user charge in accordance with the tariff information for a user of the content player.

7. A content provider system according to claim 6 comprising a content store and a key generator, the content provider system being operable to transmit requested playable content from the content store and to separately transmit a requested key generated by the key generator.

8. A content provider system according to claim 6, the content provider system being operable to transmit the tariff information.

9. A content provider system according to claim 6 wherein the key request comprises intended usage information, the content provider system being operable to generate a key in accordance with the intended usage information.

10. A content provider system according to claim 9 further comprising a usage store, wherein the content provider system is operable to store the usage information in the usage store.

11. A method of playing playable content received from a content provider system, comprising the steps of:
   receiving a user request to play playable content and generating an authorisation request comprising intended usage information identifying the playable content;
   transmitting the authorisation request to a content supervisor;
   receiving authorisation from a content supervisor and playing the playable content, where the received authorisation corresponds to the playable content; and
   transmitting content quality information to the content supervisor, the content quality information indicating a level of quality of the consumed playable content, wherein the content quality information is created in an analysis performed by the content player.

12. A method according to claim 11 comprising the steps of checking the validity of the authorisation received from the content supervisor and playing the playable content only if said authorisation is valid.

13. A content player, the content player being operable to:
   receive a user request to play playable content and generate an authorisation request comprising intended usage information identifying the playable content;
   transmit the authorisation request to a content supervisor;
   receive authorisation from the content supervisor and playing the playable content, where the received authorisation corresponds to the playable content; and
   transmit content quality information to the content supervisor, the content quality information indicating a level of quality of the consumed playable content, wherein the content quality information is created in an analysis performed by the content player.

* * * * *